United States Patent
Capoglu et al.

(10) Patent No.: US 10,895,149 B2
(45) Date of Patent: Jan. 19, 2021

(54) MULTIPLEXING ELECTROMAGNETIC TRANSMITTERS FOR MONITORING OF PERMANENT RESERVOIR

(71) Applicant: Halliburton Energy Services, Inc., Houston, TX (US)

(72) Inventors: Ilker R. Capoglu, Houston, TX (US); Burkay Donderici, Pittsford, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 241 days.

(21) Appl. No.: 15/768,386

(22) PCT Filed: Dec. 29, 2015

(86) PCT No.: PCT/US2015/067952
§ 371 (c)(1),
(2) Date: Apr. 13, 2018

(87) PCT Pub. No.: WO2017/116442
PCT Pub. Date: Jul. 6, 2017

(65) Prior Publication Data
US 2019/0093476 A1    Mar. 28, 2019

(51) Int. Cl.
*E21B 47/13* (2012.01)
*G01V 3/30* (2006.01)
(Continued)

(52) U.S. Cl.
CPC ............ *E21B 47/13* (2020.05); *E21B 47/005* (2020.05); *E21B 47/113* (2020.05); *G01V 3/30* (2013.01); *H01Q 7/08* (2013.01)

(58) Field of Classification Search
CPC ... E21B 47/0005; E21B 47/102; E21B 47/122
See application file for complete search history.

(56) References Cited

U.S. PATENT DOCUMENTS 4,710,708 A * 12/1987 Rorden ............. E21B 47/02224
324/207.26
4,965,522 A * 10/1990 Hazen ...................... G01V 3/28
324/335
(Continued)

FOREIGN PATENT DOCUMENTS

EP    0368762 B1    12/1994

OTHER PUBLICATIONS

PCT Application Serial No. PCT/US2015/067952, International Search Report, dated Aug. 24, 2016, 4 pages.
(Continued)

*Primary Examiner* — Caroline N Butcher
(74) *Attorney, Agent, or Firm* — Gilliam IP PLLC

(57) ABSTRACT

A borehole resistivity distribution system includes a cable having an array of transmitters along a shared conductive loop. Each of the transmitters is coupled to a corresponding frequency-dependent material or device. An application of a first drive signal to the cable excites the transmitters, to obtain a first measurement, the first drive signal having a first frequency and a first amplitude. An application of a second drive signal to the cable excites the transmitters, to obtain a second measurement, the second drive signal having a second frequency and a second amplitude. At least the first frequency is different from the second frequency, or the first amplitude is different from the second amplitude. The system further includes a processor coupled to receive the first and second measurements, to derive, based at least in part on the measurements, a resistivity distribution around a borehole.

20 Claims, 7 Drawing Sheets

(51) Int. Cl.
*E21B 47/005* (2012.01)
*E21B 47/113* (2012.01)
*H01Q 7/08* (2006.01)

(56) References Cited

U.S. PATENT DOCUMENTS

| | | | | |
|---|---|---|---|---|
| 5,065,099 A | * | 11/1991 | Sinclair | G01V 3/28 |
| | | | | 324/339 |
| 5,594,343 A | * | 1/1997 | Clark | G01V 3/30 |
| | | | | 324/334 |
| 2019/0218905 A1 | * | 7/2019 | Donderici | G01V 3/18 |

OTHER PUBLICATIONS

PCT Application Serial No. PCT/US2015/067952, International Written Opinion, dated Aug. 24, 2016, 11 pages.

* cited by examiner

MULTIPLEXING ELECTROMAGNETIC TRANSMITTERS FOR MONITORING OF PERMANENT RESERVOIR

BACKGROUND

A variety of techniques have been utilized for monitoring reservoir conditions, estimating quantities of hydrocarbons (e.g., oil and gas) in earth formations, and for determining formation and wellbore parameters. An example of a formation parameter is formation resistivity.

Boreholes are drilled into subsurface reservoirs to recover hydrocarbons. If the reservoir has been partially drained or if oil is particularly viscous, the reservoir may be stimulated, for example, by injecting water or other fluids into the reservoir via secondary wells, to encourage the oil to move to the primary ("production") wells and thence to the surface.

Formation resistivity is sensitive to fluid saturation. The ability to remotely determine and monitor formation resistivity is of direct relevance to reservoir monitoring, particularly when enhanced recovery using waterflooding and/or $CO_2$ injection is conducted.

BRIEF DESCRIPTION OF THE DRAWINGS

Accordingly, there are disclosed herein various systems and methods for multiplexing electromagnetic (EM) transmitters employed to monitor a permanent reservoir. In the drawings.

Figure 1:
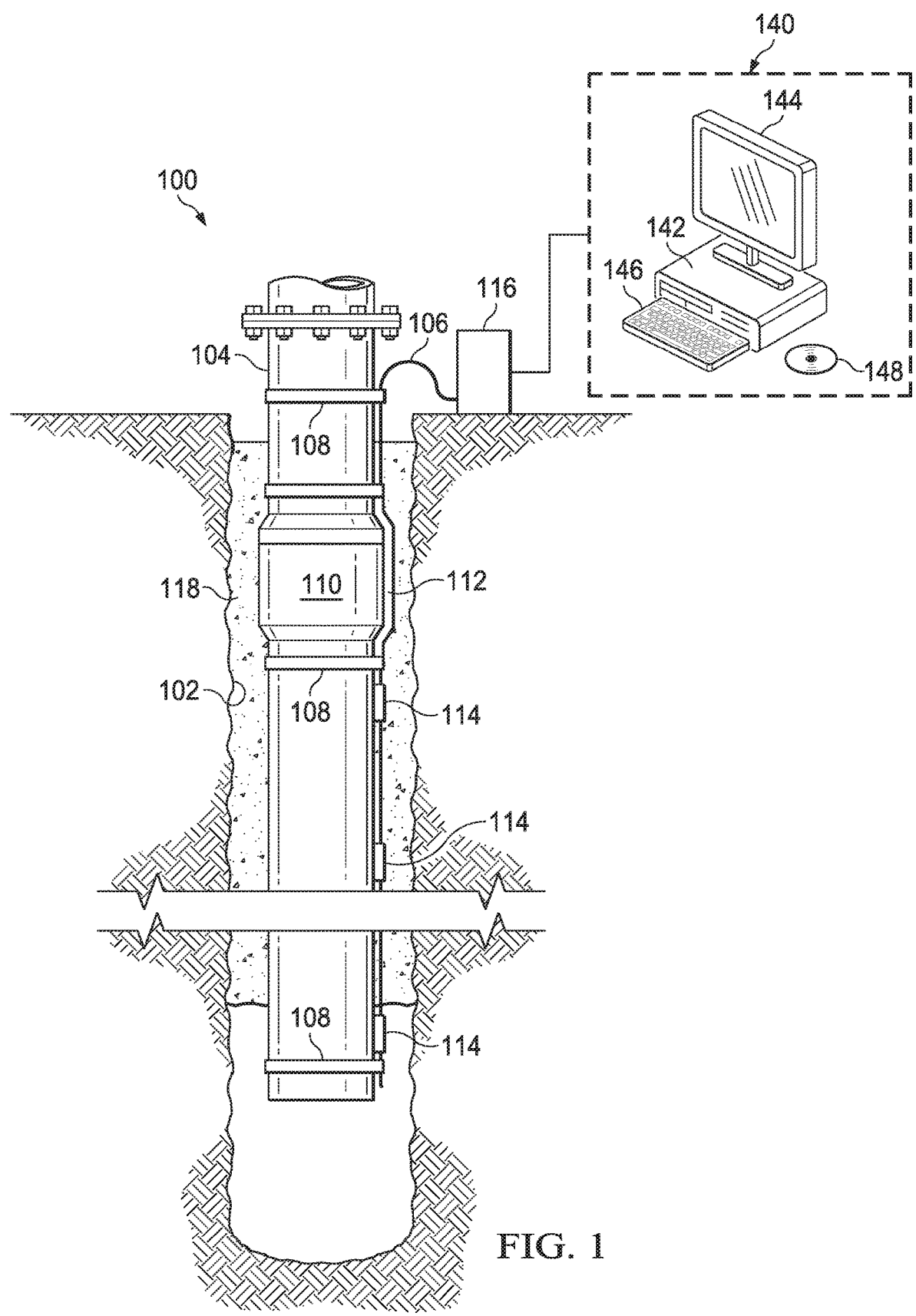
FIG. 1 shows an illustrative environment for permanent monitoring.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

The following disclosure presents a multiplexed transmitter technology suitable for use in a permanent downhole monitoring environment to monitor subsurface electromagnetic ("EM") fields, enabling the characterization and monitoring of subsurface formation properties during stimulation and production from a reservoir, and further enabling action to optimize hydrocarbon recovery from a reservoir. In at least some embodiments, a method includes disposing, within a borehole that penetrates a subterranean formation, a cable having an array of transmitters along a shared conductive loop, each of the transmitters coupled to a corresponding frequency-dependent material or device. The method further includes applying a first drive signal to the cable to excite the transmitters, to obtain a first measurement, the first drive signal having a first frequency and a first amplitude. The method further includes applying a second drive signal to the cable to excite the transmitters, to obtain a second measurement, the second drive signal having a second frequency and a second amplitude. At least the first frequency is different from the second frequency, or the first amplitude is different from the second amplitude. The method further includes deriving, based at least in part on the first and second measurements, a resistivity distribution around the borehole. A related borehole resistivity distribution system includes a cable having an array of transmitters along a shared conductive loop. Each of the transmitters is coupled to a corresponding frequency-dependent material or device. An application of a first drive signal to the cable excites the transmitters, to obtain a first measurement, the first drive signal having a first frequency and a first amplitude. An application of a second drive signal to the cable excites the transmitters, to obtain a second measurement, the second drive signal having a second frequency and a second amplitude. At least the first frequency is different from the second frequency, or the first amplitude is different from the second amplitude. The system further includes a processor coupled to receive the first and second measurements, to derive, based at least in part on the first and second measurements, a resistivity distribution around a borehole.

FIG. 1 is a diagram 100 that shows an illustrative permanent downhole monitoring environment. A borehole 102 contains a casing string 104 with a fiber optic cable 106 secured to it by bands 108. Where the cable 106 passes over a casing joint 110, the cable may be protected from damage by a cable protector 112. EM field sensors 114 (e.g., distributed feedback fiber laser strain sensors) are integrated into the cable 106 to obtain EM field measurements and communicate those measurements to a surface interface 116 via the cable 106.

The remaining annular space may be filled with cement 118 to secure the casing 104 in place and prevent fluid flows in the annular space. Fluid enters the uncemented portion of the well (or alternatively, fluid may enter through perforated portions of the well casing) and reaches the surface through the interior of the casing. This well configuration is merely illustrative and is not limiting on the scope of the disclosure. Many production wells are provided with multiple production zones that can be individually controlled. Similarly, many injection wells are provided with multiple injection zones that can be individually controlled.

The surface interface 116 includes a port for controlling transmitters via one or more transmission cables. For example, drive signals for controlling the transmitters may be applied by the surface interface 116 via the port. The transmitters generate EM fields, to which the EM field sensors 114 respond. The responses of the EM field sensors 14 can then be used to derive formation parameters (e.g., a formation resistivity profile). Derivation of such parameters is described in S. Gianzero, "The Mathematics of Resistivity and Induction Logging," The Technical Review 29, no. 1, (March 1981): 4-32, and in D. V. Ellis, J. M. Singer, "Well Logging for Earth Scientists", Springer Science & Business Media, 2007.

The surface interface 116 is coupled to a computer 140 that acts as a data acquisition system. Via a processor 142, the computer 140 may act as a data processing system that analyzes the measurements (e.g., the responses of the EM field sensors 114) to derive the formation parameters and track them over time. In some contemplated system embodiments, the computer 140 may further control production parameters to optimize production based on the information derived from the measurements. Production parameters may include the flow rate/pressure permitted from selected production zones, flow rate/pressure in selected injection zones, and the composition of the injection fluid, each of which can be controlled via computer controlled valves and pumps.

Generally, any such computer would be equipped with a user interface that enables a user to interact with software via input devices such as keyboards (e.g., keyboard 146), pointer devices, and displays/touchscreens, and via output devices such as printers, monitors (e.g., monitor 144), and touchscreens. The software can reside in computer memory and on nontransient information storage media (e.g., media 148). The computer 140 may be implemented in different forms including, e.g., an embedded computer permanently installed as part of the surface interface 116, a portable computer that is plugged into the surface interface 116 as desired to collect data, a remote desktop computer coupled to the surface interface 116 via a wireless link and/or a wired computer network, a mobile phone/PDA, or indeed any electronic device having a programmable processor and an interface for I/O.

The sensors 114 referenced above may employ fully optical technologies to measure EM fields and EM field gradients and transfer the measurement information through optical fibers to the surface for processing, to extract the measurement information. In at least some embodiments, the sensors operate passively. Alternatively (or in addition), sensors with minimal power requirements can be powered from small batteries, in at least some situations. The minimization of electronics or downhole power sources provides a reliability advantage. Because multiple sensors can share a single fiber, the use of multiple wires with associated connectors and/or multiplexers can also be avoided, further enhancing reliability, while also reducing costs.

Accordingly, a production well may be equipped with a permanent array of sensors (e.g., sensors 114) outside the casing. The sensors may be positioned inside the cement or at the boundary between cement and the formation. Each sensor is either on or in the vicinity of a fiber optic cable (e.g., cable 106) that serves as the communication link with the surface (e.g., surface interface 116). Sensor transducers can directly interact with the fiber optic cables or, in some contemplated embodiments, may produce electrical signals that in turn induce thermal, mechanical (strain), acoustic or electromagnetic effects on the fiber. Each fiber optic cable may be associated with multiple EM sensors, while each sensor may produce a signal in multiple optic or fiber optic cables. The sensors may be uniformly spaced. Alternatively, the sensor positioning can be optimized based on geology or assigned randomly. In any configuration, the sensor positions can often be precisely located by monitoring the light signal travel times in the fiber.

Each sensor may be used to derive properties of the formation at or near the depth at which the sensor is positioned. With respect to a sensor positioned at a particular depth, a degree of vertical sensitivity may be improved by providing multiple transmitters at various depths in the vicinity of the sensor. The sensor is responsive to signals transmitted by any of the multiple transmitters.

Figure 2:
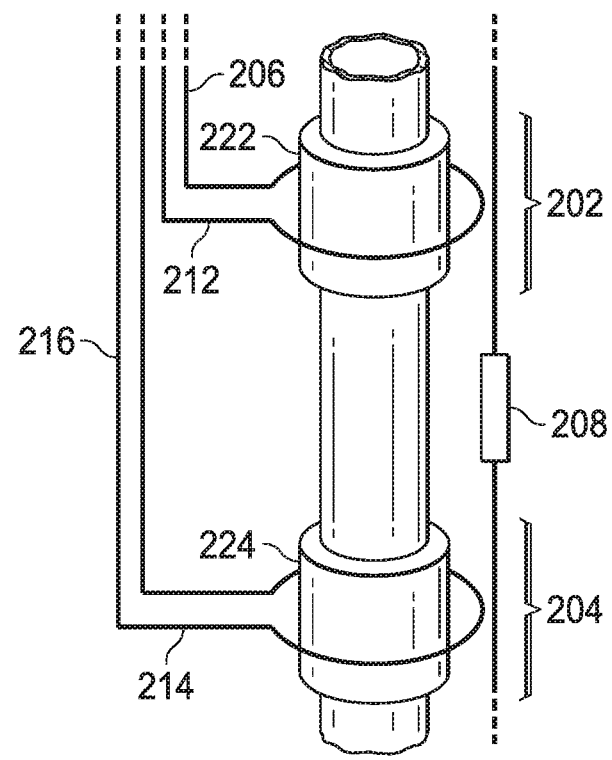
FIG. 2 illustrates an example of a transmitter arrangement.

FIG. 2 illustrates an example of a transmitter arrangement. Transmitters 202, 204 are provided at different depths in the vicinity of a sensor 208. The sensor 208 responds to signals that are transmitted by the transmitters 202, 204.

The transmitter 202 is provided along a conductive loop 206, and the transmitter 204 is provided along a conductive loop 216. Each of the conductive loops 206, 216 may be an insulated wire. The transmitters 202, 204 may each include a coil and a magnetic core, which increases a magnetic field that is produced by the coil. For example, the transmitter 202 includes a coil 212 and a magnetic core 222. Similarly, the transmitter 204 includes a coil 214 and a magnetic core 224.

Because the transmitters 202, 204 are provided along different conductive loops, the transmitters can be individually energized by switching operations uphole. Such switching operation may be performed, e.g., by surface interface 116. The energization of the transmitters 202, 204 is independently controllable via the conductive loops 206, 216. In this manner, a multiplexing of the transmitters is facilitated, such that, for example, signals transmitted by the transmitters can be separated or differentiated at a receiving end, or at a receiving device. However, multiplexing a larger number of transmitters in this manner requires a correspondingly higher number of conductive loops. Such a large number of loops may be quite bulky and costly, especially if tens or hundreds of transmitters are involved.

Aspects of the disclosure are directed to facilitating a multiplexing of transmitters that are provided along a same conductive loop.

Figure 3:
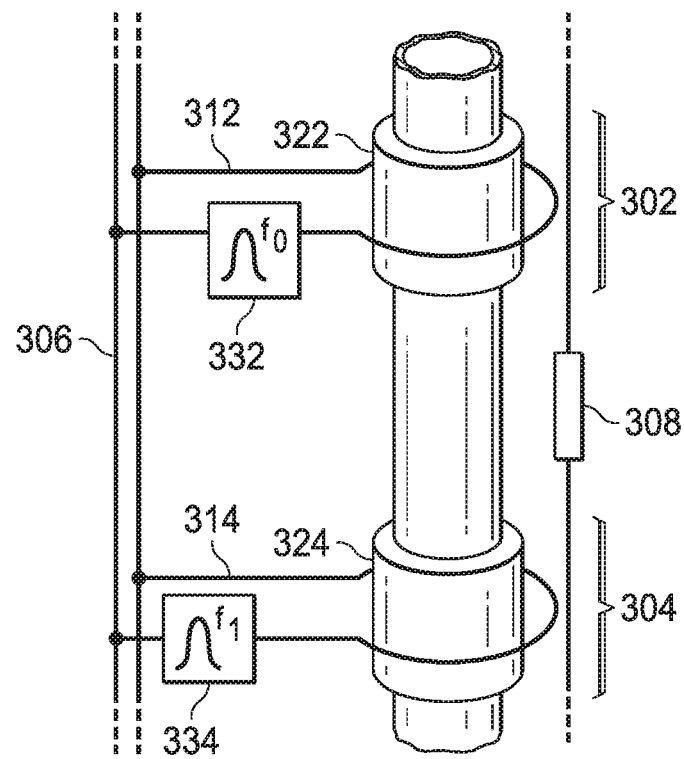
FIG. 3 illustrates another example of a transmitter arrangement.

FIG. 3 illustrates another example of a transmitter arrangement. Transmitters 302, 304 are provided at different depths in the vicinity of a sensor 308. The sensor 308 responds to signals that are transmitted by the transmitters 302, 304.

The transmitters 302, 304 are provided along a shared conductive loop 306. In more detail, the transmitters 302, 304 are coupled in parallel along the shared conductive loop 306.

The shared conductive loop 306 may be an insulated wire. The transmitters 302, 304 each includes a coil. For example, the transmitter 302 includes a coil 312, and the transmitter 304 includes a coil 314.

The transmitters 302, 304 are each coupled to a frequency-dependent material and/or a frequency-dependent device. The frequency-dependent material may include a magnetic core, which increases a magnetic field that is produced by the coil. For example, the transmitter 302 is coupled to a magnetic core 322 which increases a magnetic field that is produced by the coil 312. Similarly, the transmitter 304 is coupled to a magnetic core 324 which increases a magnetic field that is produced by the coil 314.

The loop 306 serves as a conduit for delivering drive signals for exciting the transmitters 302, 304. For example, the drive signals may provide a common voltage excitation for the transmitters 302, 304. As will be described in more detail below, the drive signals may be applied to the loop 306, either in turn or concurrently, to excite the transmitters 302, 304.

As noted earlier, the transmitters 302, 304 are each coupled to a frequency-dependent material and/or a frequency-dependent device. The frequency-dependent device may include a bandpass filter. Bandpass filters that are coupled in series with the transmitter coils 312, 314 control the frequency content of the drive signal that arrives at the transmitters 302, 304. Accordingly, the bandpass filters facilitate individual activation of the transmitters 302, 304. For example, each of the transmitters is coupled to the loop 306 via a respective bandpass filter. The transmitter 302 is coupled to the loop 306 via a bandpass filter 332. The transmitter 304 is coupled to the loop 306 via a bandpass filter 334. A degree to which the bandpass filters 332, 334 pass the drive signal to the transmitters 302, 304 depends on the frequency content of the drive signal. As will be described in more detail below, the bandpass filters 332, 334 are centered at different frequencies.

The bandpass filter 332 has a passband (e.g., narrowband) that is centered around a particular frequency (e.g., $f_0$). As such, when a drive signal (e.g., a first drive signal) is applied via the loop 306, the bandpass filter 332 behaves like an open circuit at all frequencies, except for frequencies in the passband centered around the frequency $f_0$. In this passband, the bandpass filter 332 behaves like a short circuit and allows current to flow through to the transmitter 302.

Similarly, the bandpass filter 334 has a passband (e.g., narrowband) that is centered around a particular frequency (a frequency different from $f_0$, e.g., $f_1$). As such, when a drive signal (e.g., a second drive signal) is applied via the loop 306, the bandpass filter 334 behaves like an open circuit at all frequencies, except for frequencies in the passband centered around the frequency $f_1$. In this passband, the bandpass filter 334 behaves like a short circuit and allows current to flow through to the transmitter 304.

In at least some embodiments, the frequency separation between the respective passbands of the bandpass filters 332, 334 is suitably large such that the passbands are nonoverlapping.

As such, the transmitters 302, 304 are effectively frequency multiplexed to produce transmitted signals at distinct frequencies. In this regard, a first drive signal and a second drive signal may be applied in turn (e.g., sequentially) to excite the multiplexed transmitters in turn. For example, at a first time, the first drive signal is applied. The drive signal has a suitably strong spectral component(s) at around the frequency $f_0$. The first drive signal lacks similarly strong spectral component(s) at around the frequency $f_1$. Accordingly, the bandpass filter 332 allows current of the first drive signal to flow through to the transmitter 302. Therefore, the transmitter 302 is excited by the first drive signal, and transmits a signal at the frequency $f_0$.

However, the bandpass filter 334 substantially blocks the current of the first drive signal from reaching the transmitter 304. Therefore, the transmitter 304 is left substantially inactive, and does not transmit a signal. Accordingly, the sensor 308 receives a signal from transmitter 302, and not from transmitter 304. The sensor 308 (or another device, e.g., surface interface 116, which is coupled to the sensor 308) is aware that the signal is received from transmitter 302, and not from transmitter 304. (This may be based on, for example, a determined frequency of the received signal, or knowledge regarding the strength of the spectral component(s) of the first drive signal.) As such, it is known that a corresponding response of the sensor 308 is due to activation of transmitter 302, and not to activation of transmitter 304.

Further, at a second time (e.g., a time later than the first time), the second drive signal is applied. The second drive signal has a suitably strong spectral component(s) at around frequency $f_1$. The second drive signal lacks similarly strong spectral component(s) at around the frequency $f_0$. Accordingly, the bandpass filter 334 allows current of the second drive signal to flow through to the transmitter 304. Therefore, the transmitter 304 is excited by the second drive signal, and transmits a signal at the frequency $f_1$.

However, the bandpass filter 332 substantially blocks the current of the second drive signal from reaching the transmitter 302. Therefore, the transmitter 302 is left substantially inactive, and does not transmit a signal. Accordingly, the sensor 308 receives a signal from transmitter 304, and not from transmitter 302. The sensor 308 (or another device, e.g., surface interface 116, which is coupled to the sensor 308) is aware that the signal is received from transmitter 304, and not from transmitter 302. (This may be based on, for example, a determined frequency of the received signal, or knowledge regarding the strength of the spectral component(s) of the second drive signal.) As such, it is known that a corresponding response of the sensor 308 is due to activation of transmitter 304, and not to activation of transmitter 302.

Alternatively, the first drive signal and the second drive signal may be concurrently applied to excite the transmitters 302, 304. For example, at a same time, the first drive signal (having suitably strong spectral component(s) at around the frequency $f_0$) and the second drive signal (having suitably strong spectral component(s) at around the frequency $f_1$) are applied. Accordingly, the bandpass filter 332 allows current of the first drive signal to flow through to the transmitter 302, and the bandpass filter 334 allows current of the second drive signal to flow through to the transmitter 304. Therefore, the transmitters 302 and 304 are both excited by the drive signals, and transmit signals at the frequencies $f_0$ and $f_1$, respectively. Therefore, the sensor 308 receives signals from both transmitters 302 and 304.

In the alternative situation described above, the sensor 308 receives a sum of the signals from the transmitters 302 and 304. During subsequent processing (e.g., at the sensor 308, or surface interface 116), the response of the sensor 308 due to activation of both the transmitter 302 and the transmitter 304 may be separated (or differentiated) from each other. For example, the responses may be separated from each other using bandpass filters having passbands centered around the frequencies $f_0$ and $f_1$, respectively.

Although reception of transmitted signals (e.g., signals transmitted by the transmitters 302, 304) has been described with respect to a single sensor (e.g., sensor 308), it is understood that such signals may be received at multiple sensors. As described earlier with respect to FIG. 1, multiple EM field sensors 114 are integrated into the cable 106 to obtain EM field measurements. Accordingly, two or more of such sensors (e.g., adjacent sensors) may receive signals transmitted by the transmitters 302, 304. EM field measurements obtained using multiple sensors may be used to derive properties of the formation.

Figure 4:
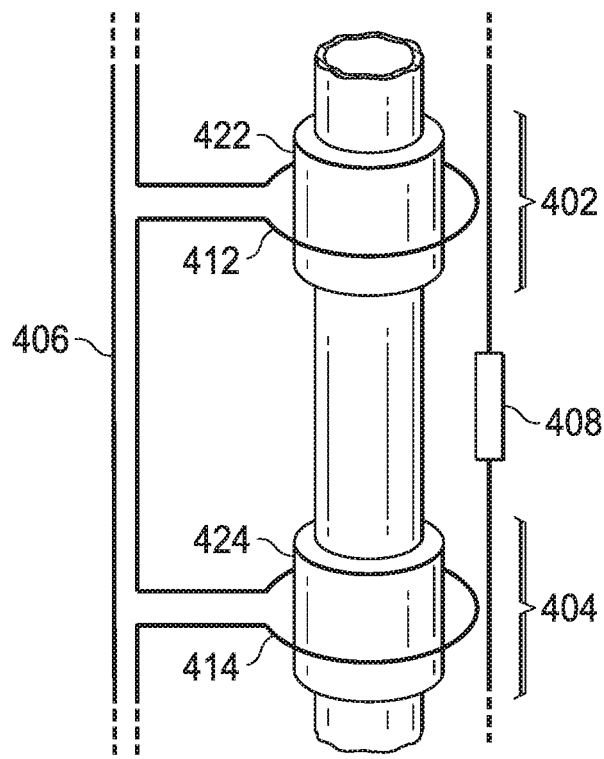
FIG. 4 illustrates yet another example of a transmitter arrangement.

FIG. 4 illustrates yet another example of a transmitter arrangement. Transmitters 402, 404 are provided at different depths in the vicinity of a sensor 408. The sensor 408 responds to signals that are transmitted by the transmitters 402, 404.

Similar to the transmitters 302, 304 of FIG. 3, the transmitters 402, 404 are provided along a shared conductive loop 406. Different from the transmitters 302, 304 of FIG. 3, the transmitters 402, 404 are coupled in series along the shared conductive loop 406. The shared conductive loop 406 may be an insulated wire. The transmitters 402, 404 each include a coil. For example, the transmitter 402 includes a coil 412, and the transmitter 404 includes a coil 414.

The transmitters 402, 404 are each coupled to a frequency-dependent material and/or a frequency-dependent device. The frequency-dependent material may include a magnetic core which increases a magnetic field that is produced by the coil. For example, the transmitter 402 is coupled to a magnetic core 422 which increases a magnetic field that is produced by the coil 412. Similarly, the transmitter 404 is coupled to a magnetic core 424 which increases a magnetic field that is produced by the coil 414. The cores 422, 424 may be made of a material that is highly magnetic (e.g., a material with very high permeability). The cores 422, 424 may also have suitable insulation characteristics (e.g., to reduce eddy-current losses).

The loop 406 serves as a conduit for delivering one or more drive signal(s) for exciting the transmitters 402, 404. For example, the drive signal(s) may provide a common voltage excitation (e.g., a signal at the frequency $f_0$) for the transmitters 402, 404. However, in response to the common excitation, the transmitters 402, 404 may transmit signals that have spectrally distinctive spectra. For example, one of the signals has spectra that are distinctive from the spectra of another signal. The transmitters 402, 404 may transmit such distinct signals, for example, if the magnetic cores 422, 424 have different saturation characteristics. In at least some embodiments, the magnetic cores 422, 424 saturate at different magnetic field levels.

Figure 5:
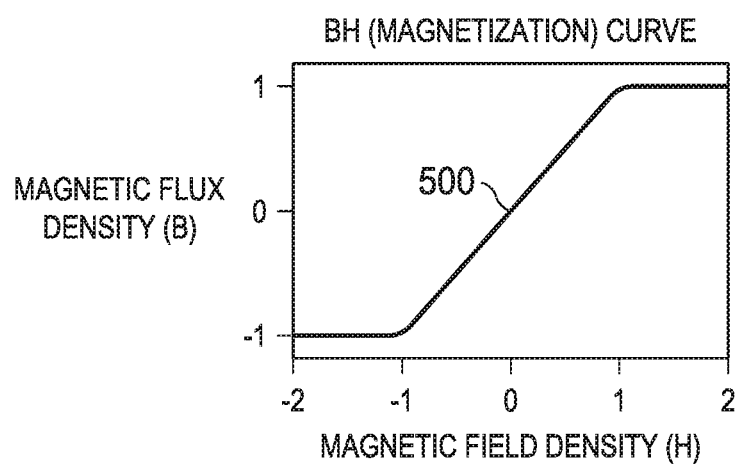
FIG. 5 shows a simplified illustrative BH curve (magnetization curve) of a magnetic core.

FIG. 5 shows an illustrative BH curve 500 (also called a magnetization curve or a hysteresis curve) of a magnetic core (e.g., core 422, 424). The curve 500 depicts the magnetic flux density (B) of the core as a function of a magnetic field density (H) generated by a coil (e.g. coil 412, 414). As illustrated in FIG. 5, the core saturates at B=±1 when H=±1.

The curve 500 is depicted in simplified form for illustrative purposes. The units of the magnetic flux and magnetic field densities are not shown. It is understood that the saturation values of these densities may vary. Further, the curve 500 may have shapes other than the shape illustrated in FIG. 5. For example, the curve 500 may have a shape of hysteresis loop. Also, the magnetization may also be rate dependent.

When the core becomes saturated, a waveform of the magnetic flux density becomes non-sinusoidal. Accordingly, the harmonic content of this waveform includes components at not only a principal frequency (e.g., $f_0$) but also at higher harmonics (e.g., $2f_0$, $3f_0$, etc.). When two cores (e.g., cores 422, 424) have saturation characteristics that are different from one other (e.g., the cores 422, 424 saturate at different magnetic field levels), a particular input (a particular value of a current applied to the coil) may cause one of the cores (e.g., core 424) to saturate. At the same time, the same input may not cause the other core (e.g., core 422) to saturate. Therefore, the other core remains unsaturated. In such a situation, the magnetic flux waveforms of the two cores are different from each other, such that the harmonic content of the waveforms is also different.

Accordingly, the transmitters (e.g., transmitters 402, 404) may transmit signals that have spectrally-distinctive and linearly-independent spectra. A receiving end (e.g., sensor 308, surface interface 116) can separate a signal generated by one transmitter (e.g., transmitter 402) from a signal generated by another transmitter (e.g., transmitter 404) by decomposing the harmonic content of a composite received signal into known harmonic contents corresponding to the two transmitters.

With reference back to FIG. 4, the cores 422, 424 may also be caused to have different saturation characteristics when the coils 412, 414 have different numbers of turns. For example, the coil 412 may have N1 turns, and the coil 414 may have N2 turns, where N1 and N2 are not equal to each other. N1 and N2 are selected such that a particular input (a particular value of a current) causes one of the cores (e.g., core 424) to saturate, but does not cause the other core (e.g., core 422) to saturate. Accordingly, the transmitters 402, 404 may produce spectrally-distinctive signals in response to a common input, even when the cores 422, 424 are made of a same magnetic material.

Figure 6A:
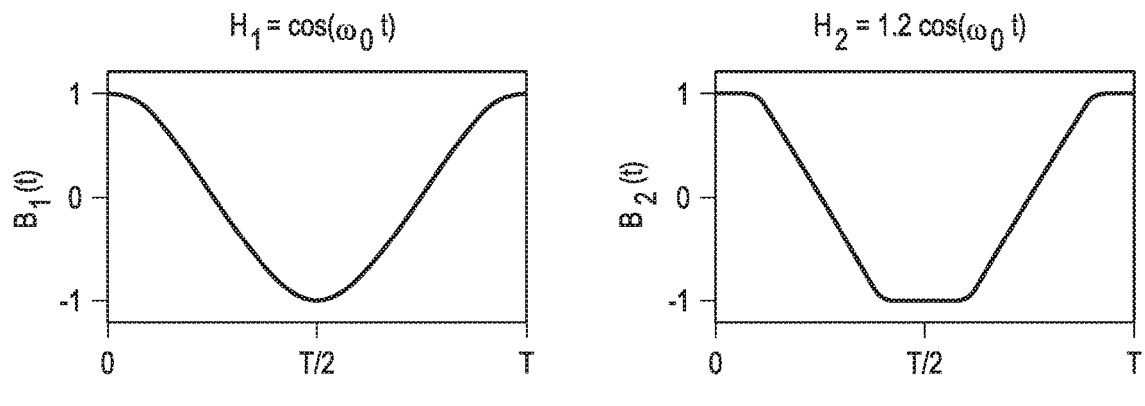
FIG. 6A illustrates examples of magnetic flux waveforms that are produced in response to a common input.

FIG. 6A illustrates examples of magnetic flux waveforms that are produced in response to a common input (a common current applied to the coil). For purposes of simplicity, it is assumed that the cores (e.g., core 422 coupled to transmitter 402, and core 424 coupled to transmitter 404) have BH curves similar to the curve 500 of FIG. 5.

With reference to FIG. 6A, the magnetic field density generated by the coil of one transmitter (e.g., coil 412 of transmitter 402) is denoted as $H_1(t)$. The magnetic field density generated by the coil of another transmitter (e.g., coil 422 of transmitter 404) is denoted as $H_2(t)$. The coil 412 has N1 turns, and the coil 414 has N2 turns. N1 and N2 are configured such that $H_1(t)$ and $H_2(t)$ are different from each other when a common input is provided. For example, $H_1(t)=\cos(\omega_0 t)$ and $H_2(t)=1.2 \cos(\omega_0 t)$. This situation can be achieved when, e.g., the coil 414 has 20% more turns than the coil 412 (N2=1.2*N1).

The magnetic flux density generated by the core coupled to the first transmitter (e.g., core 422 coupled to transmitter 402) is denoted as $B_1(t)$. The magnetic flux density generated by the core coupled to the second transmitter (e.g., core 424 coupled to transmitter 404) is denoted as $B_2(t)$. As illustrated in FIG. 6A, $B_1(t)$ is sinusoidal (e.g., purely sinusoidal) in nature. This is because the amplitude of the magnetic field density $H_1(t)$ does not exceed the saturation value of 1 (see FIG. 5). In contrast, $B_2(t)$ is not purely sinusoidal in nature. This is because the amplitude of the magnetic field density $H_2(t)$ has a value of 1.2, which exceeds the saturation value of 1.

Figure 6B:
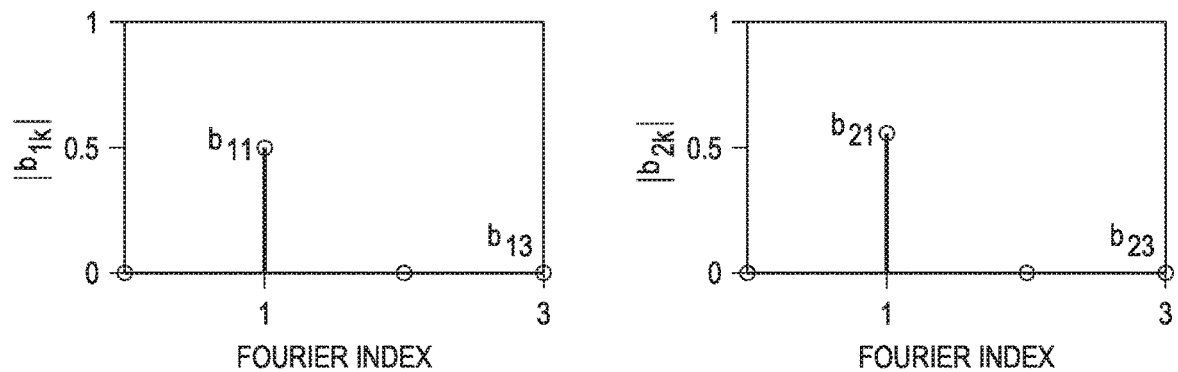
FIG. 6B illustrates harmonic contents of the magnetic flux waveforms of FIG. 6A.

FIG. 6B illustrates harmonic contents of the magnetic flux waveforms of FIG. 6A. In more detail, the leftmost plot shows the Fourier series coefficients $b_{1k}$ of the magnetic flux density $B_1(t)$. The rightmost plot shows the Fourier series coefficients $b_{2k}$ of the magnetic flux density $B_2(t)$. These coefficients are the weights of the kth harmonic at frequency $k\omega_0$, as expressed in Equations (1) and (2) below:

$$B_1(t) = \sum_{k=-\infty}^{\infty} b_{1k} e^{jk\omega_0 t} \quad (1)$$

and $$B_2(t) = \sum_{k=-\infty}^{\infty} b_{2k} e^{jk\omega_0 t} \quad (2)$$

As noted earlier, $B_1(t)$ is sinusoidal in nature, with a frequency of $\omega_0$. Accordingly, the values of the Fourier coefficients $b_{1k}$ are all minimal (e.g., close to zero), except when k=±1 (at the principal harmonic $\omega_0$).

As also noted earlier, $B_2(t)$ is not purely sinusoidal in nature. Accordingly, compared to the Fourier coefficients $b_{1k}$, the values of the Fourier coefficients $b_{2k}$ are all relatively larger than zero at higher harmonics (e.g., odd values of k, where k=±1, ±3, etc.).

The signal received at a receiver (e.g., sensor 408) is denoted as r(t). This signal may be expressed in terms of its Fourier coefficients $r_k$, as follows:

$$r(t) = \sum_{k=-\infty}^{\infty} r_k e^{jk\omega_0 t} \quad (3)$$

The coefficients $r_k$ are a linear combination of the Fourier coefficients $b_{1k}$ and $b_{2k}$ corresponding to the two transmitters (e.g., transmitters 402, 404):

$$r_k = T_{1k} b_{1k} + T_{2k} b_{2k}, \quad (4)$$

where $T_{1k}$ denotes the transfer function between the first transmitter (e.g., transmitter 402) and the receiver at frequency $k\omega_0$, and $T_{2k}$ denotes the transfer function between the second transmitter (e.g., transmitter 404) and the receiver at frequency $k\omega_0$. The signal may be received as a voltage on a coil. In this situation, the k-dependence of the transfer function may be factored out.

The transfer function may be considered as the sum of a direct signal component and a scattered signal component. The former is linearly proportional to frequency, and the latter is proportional to the square of the frequency. Because the kth harmonic has frequency $k\omega_0$, the transfer functions $T_{1k}$ and $T_{2k}$ can be expressed as:

$$T_{1k} = k T_1^d + k^2 T_1 \quad (5)$$

and $$T_{2k} = k T_2^d + k^2 T_2 \quad (6)$$

Here, $T_1^d$ and $T_1$ respectively denote the direct signal component and the scattered signal component of the transfer function $T_{1k}$. $T_2^d$ and $T_2$ respectively denote the direct signal component and the scattered signal component of the transfer function $T_{2k}$. Since the direct signal components are those obtained in air, $T_1^d$ and $T_2^d$ can be measured or computed beforehand and calibrated (subtracted) out of the received signal. Alternatively, the direct signal components can be canceled out using known bucking techniques. The calibrated Fourier coefficients of the received signal r(t) may be denoted as $\tilde{r}_k$. These components may be expressed as follows:

$$\tilde{r}_k = r_k - k T_1^d b_{1k} - k T_2^d b_{2k} \quad (7)$$

The calibrated Fourier coefficients may also be expressed as follows:

$$\tilde{r}_k = (k^2 b_{1k}) T_1 + (k^2 b_{2k}) T_2, \quad (8)$$

Based on the above Equation (8), the scattered-field transfer functions $T_1$ and $T_2$ are unknown parameters (e.g., weights) that can be computed from the received signal r(t). The transfer functions $T_1$ and $T_2$ reflect the respective contributions of the two transmitters (e.g., transmitters 402 and 404) to the received signal. Because the transmitters are positioned at different depths (see, e.g., FIG. 4), the transfer functions $T_1$ and $T_2$ carry information about the formation at different vertical ranges. Accordingly, these transfer functions may be processed (e.g., input to inversion algorithms) in order to determine properties of the formation (e.g., formation resistivity) at a finer level of vertical sensitivity.

To compute the transfer functions $T_1$ and $T_2$, only the following two equations are needed:

$$\tilde{e}_1 = b_{11} T_1 + b_{21} T_2 \quad (9)$$

and $$\tilde{r}_3 = 9 b_{13} T_1 + 9 b_{23} T_2 \quad (10)$$

Accordingly, $T_1$ and $T_2$ may be obtained by solving a matrix equation as follows:

$$\begin{bmatrix} T_1 \\ T_2 \end{bmatrix} = \begin{bmatrix} b_{11} & b_{21} \\ 9 b_{13} & 9 b_{23} \end{bmatrix}^{-1} \begin{bmatrix} \tilde{r}_1 \\ \tilde{r}_3 \end{bmatrix}. \quad (11)$$

In the example of FIGS. 6A and 6B, the 2×2 matrix to be inverted in Equation (11) is fairly well behaved, with a condition number of only 4.3.

Figure 6C:
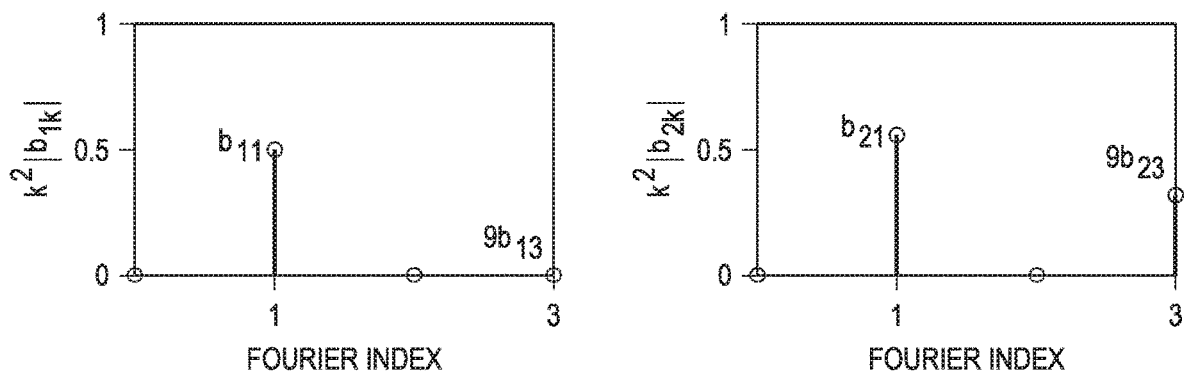
FIG. 6C illustrates scaled harmonic contents of the magnetic flux waveforms of FIG. 6A.

FIG. 6C illustrates scaled harmonic contents of the magnetic flux waveforms of FIG. 6A. In more detail, the leftmost plot shows the scaled Fourier series coefficients $k^2 * b_{1k}$ of the magnetic flux density $B_1(t)$. The rightmost plot shows the scaled Fourier series coefficients $k^2 * b_{2k}$ of the magnetic flux density $B_2(t)$. The scaling factor of $k^2$ accentuates the higher harmonic components of the saturated magnetic flux density $B_2(t)$ (e.g., $b_{23}$).

As described earlier with reference to FIG. 4, the cores 422, 424 may be caused to have different saturation characteristics. According to earlier-described examples, this may occur when the coils 412, 414 have different numbers of turns. According to another example, this may also occur when the cores 422, 424 are made of different magnetic materials (e.g., core 422 is made of a magnetic material that is different from that of core 424). Therefore, the magnetic flux generated by the core 422 saturates at a different point (e.g., at a different magnetic field level) relative to the magnetic flux generated by the core 424. The different magnetic materials may be selected such that, e.g., a particular input (a particular value of a current) causes one of the cores (e.g., core 424) to saturate, but does not cause the other core (e.g., core 422) to saturate. Accordingly, the transmitters 402, 404 may produce signals having spectrally distinctive and linearly independent spectra in response to a common input, even when the coils 412, 414 have a same number of turns.

Figure 7:
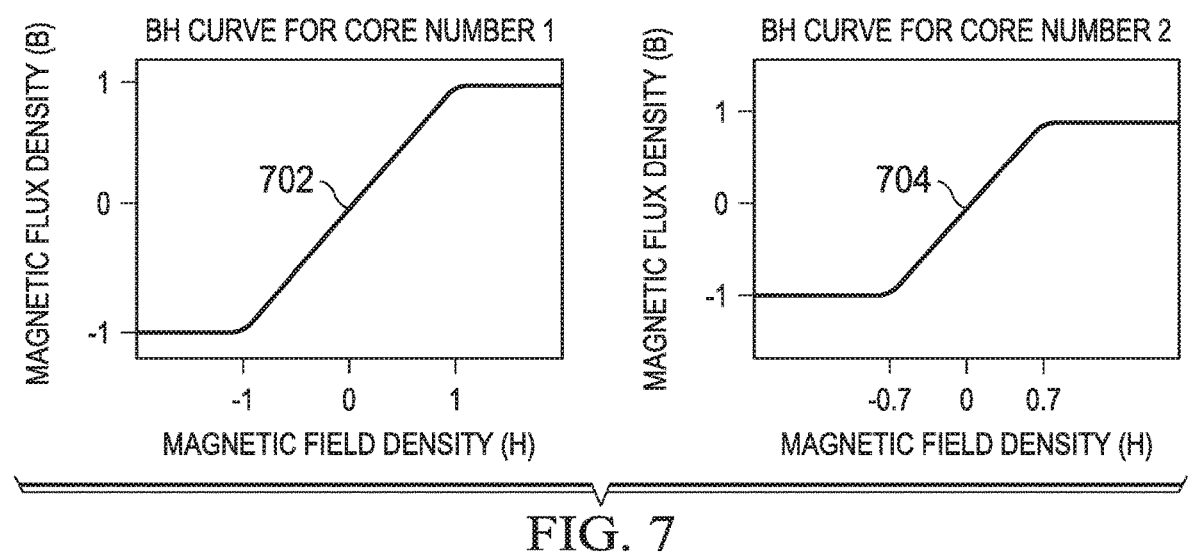
FIG. 7 shows simplified illustrative BH curves of magnetic cores.

FIG. 7 shows illustrative BH curves 702 and 704 corresponding to two cores (e.g., core 422, 424). The curve 702 depicts the magnetic flux density (B) of the core 422 as a function of a magnetic field density (H) generated by a coil (e.g., coil 412). As illustrated in FIG. 7, the core 422 saturates at B=±1 when H=±1. The curve 704 depicts the magnetic flux density (B) of the core 424 as a function of a magnetic field density (H) generated by a coil (e.g., coil 414). As illustrated in FIG. 7, the core 424 saturates at B=±0.7 when H=±0.7.

Similar to the curve 500 of FIG. 5, the curves 702, 704 are depicted in simplified form for illustrative purposes. The units of the magnetic flux and magnetic field densities are not shown. It is understood that the saturation values of these densities may vary. Further, the curves 702, 704 may have shapes other than those that are illustrated.

Figure 8A:
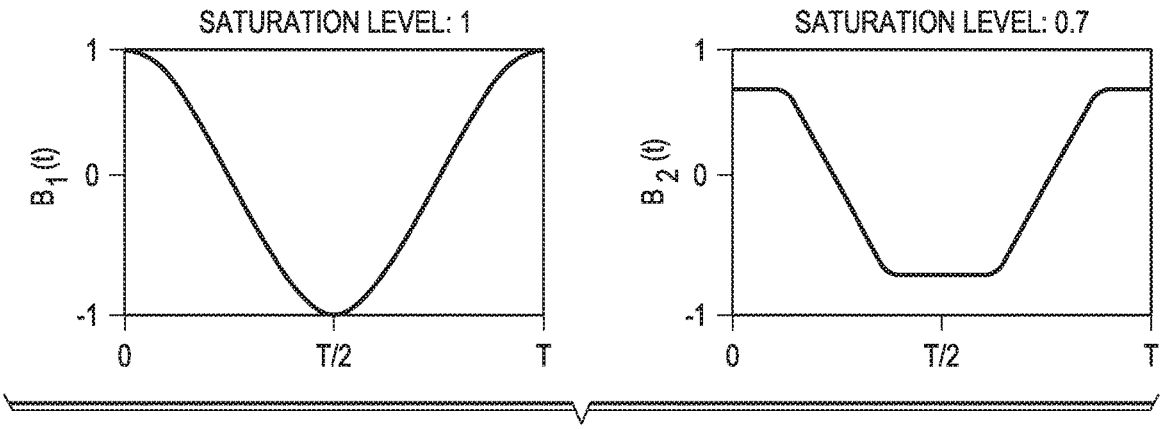
FIG. 8A illustrates examples of magnetic flux waveforms that are produced in response to a common input.

FIG. 8A illustrates examples of magnetic flux waveforms that are produced in response to a magnetic field of a same amplitude (e.g., a unit-amplitude sinusoid $H(t)=\cos(\omega_0 t)$). For purposes of simplicity, it is assumed that the cores (e.g., core 422 coupled to transmitter 402, and core 424 coupled to transmitter 404) have BH curves similar to the curves 702, 704 of FIG. 7.

With reference to FIG. 8A, the magnetic flux density generated by the core of one transmitter (e.g., core 422 coupled to transmitter 402) is denoted as $B_1(t)$. The magnetic flux density generated by the core of another transmitter (e.g., core 424 coupled to transmitter 404) is denoted as $B_2(t)$.

As illustrated in FIG. 8A, $B_1(t)$ is sinusoidal (e.g., purely sinusoidal) in nature and does not saturate in response to the unit-amplitude sinusoid H(t). Because the saturation level of the core 424 is lower than that of the core 422, $B_2(t)$ is not purely sinusoidal in nature. As illustrated in FIG. 8A, $B_2(t)$ saturates in response to the unit-amplitude sinusoid H(t).

Figure 8B:
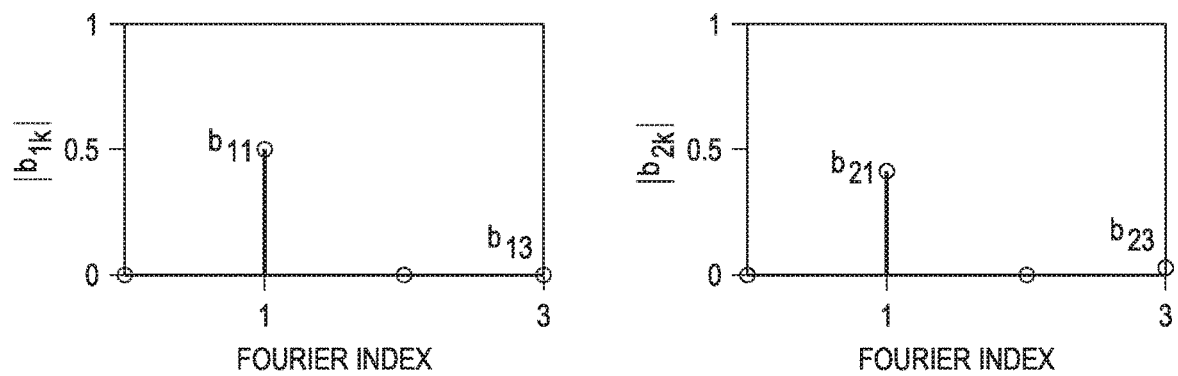
FIG. 8B illustrates harmonic contents of the magnetic flux waveforms of FIG. 8A.

FIG. 8B illustrates harmonic contents of the magnetic flux waveforms of FIG. 8A. In more detail, the leftmost plot shows the Fourier series coefficients $b_{1k}$ of the magnetic flux density $B_1(t)$. The rightmost plot shows the Fourier series coefficients $b_{2k}$ of the magnetic flux density $B_2(t)$.

As noted earlier, $B_1(t)$ is sinusoidal in nature, with a frequency $\omega_0$. Accordingly, the values of the Fourier coefficients $b_{1k}$ are all minimal (e.g., close to zero), except when k=±1 (at the principal harmonic $\omega_0$).

As also noted earlier, $B_2(t)$ is not purely sinusoidal in nature. Accordingly, compared to the Fourier coefficients $b_{1k}$, the values of the Fourier coefficients $b_{2k}$ are all relatively larger than zero at higher harmonics (e.g., odd values of k, where k=±1, ±3, etc.).

Figure 8C:
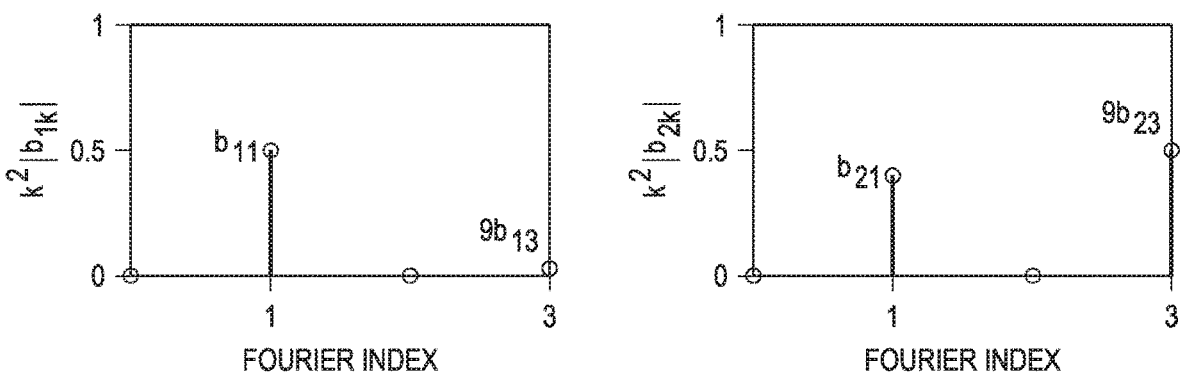
FIG. 8C illustrates scaled harmonic contents of the magnetic flux waveforms of FIG. 8A.

FIG. 8C illustrates scaled harmonic contents of the magnetic flux waveforms of FIG. 8A. In more detail, the leftmost plot shows the scaled Fourier series coefficients $k^2 \ast b_{1k}$ of the magnetic flux density $B_1(t)$. The rightmost plot shows the scaled Fourier series coefficients $k^2 \ast b_{2k}$ of the magnetic flux density $B_2(t)$. The scaling factor of $k^2$ accentuates the higher harmonic components of the saturated magnetic flux density $B_2(t)$ (e.g., $b_{23}$).

Similar to the example described earlier with reference to FIGS. 5, 6A and 6B, scattered-field transfer functions (e.g., $T_1$ and $T_2$, as described earlier with reference to the noted figures) are unknown parameters (e.g., weights) that can be computed from a received signal r(t). The transfer functions reflect the respective contributions of different transmitters (e.g., transmitters 402 and 404) to the received signal. In the example of FIGS. 7, 8A and 8B, the scattered-field transfer functions may be determined by inverting the following matrix:

$$\begin{bmatrix} b_{11} & b_{21} \\ 9b_{13} & 9b_{23} \end{bmatrix}$$

In the example of FIGS. 7, 8A and 8B, the above 2×2 matrix that is to be inverted is fairly well behaved, with a condition number of only 2.4.

As described earlier with reference to various examples, two cores (e.g., cores 422, 424) may be caused to have different saturation characteristics by configuring the corresponding coils to have different numbers of turns and/or providing cores that are made of different magnetic materials. It is understood that other factors/elements may cause the cores to have different saturation characteristics. By way of example, a nonlinear component (e.g., a diode) that is coupled to the coil input of at least one of the cores may cause the cores to have different saturation characteristics with respect to one another.

For purposes of simplicity, various features of this disclosure have been described with respect to a geometric arrangement including two transmitters and a single receiver (sensor). It is understood that such features apply equally to arrangements including more than two transmitters and/or two or more receiver(s) in other geometrical arrangements. For example, the receivers may be orientated arbitrarily with respect to each other both vertically and azimuthally. Similarly, the transmitters may be orientated arbitrarily with respect to each other both vertically and azimuthally.

The receiver may be a linear device that is capable of measuring magnetic field. For example, the receiver may be an inductive pickup coil that converts a magnetic field to a voltage. Alternatively, the receiver may be a magnetostrictive (MS) sensor consisting of a ferromagnetic transducer that converts a magnetic field to a strain.

Figure 9:
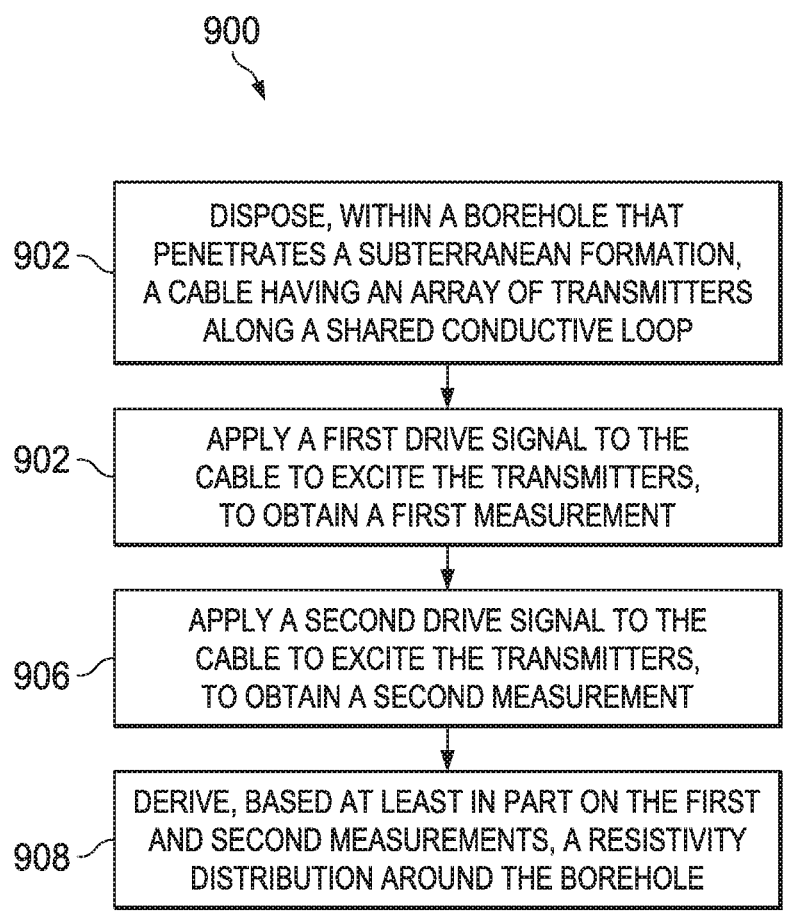
FIG. 9 is a flowchart showing an illustrative method employing multiplexed transmitters.

FIG. 9 is a flowchart showing an illustrative monitoring method 900 employing multiplexed transmitters. In the method 900, a cable is disposed within a borehole that penetrates a subterranean formation at block 902. For example, with reference to FIG. 1, cable 106 is disposed within borehole 102. The cable has an array of transmitters along a shared conductive loop. Each of the transmitters is coupled to a corresponding frequency-dependent material or device. At block 904, a first drive signal is applied to the cable to excite the transmitters, to obtain a first measurement, the first drive signal having a first frequency and a first amplitude. At block 906, a second drive signal is applied to the cable to excite the transmitters, to obtain a second measurement, the second drive signal having a second frequency and a second amplitude. At least the first frequency is different from the second frequency, or the first amplitude is different from the second amplitude. At block 908, a resistivity distribution around the borehole is derived, based at least in part on the first and second measurements.

Embodiments disclosed herein include:

A: A borehole resistivity distribution system that includes a cable having an array of transmitters along a shared conductive loop. Each of the transmitters is coupled to a corresponding frequency-dependent material or device. An application of a first drive signal to the cable excites the transmitters, to obtain a first measurement, the first drive signal having a first frequency and a first amplitude. An application of a second drive signal to the cable excites the transmitters, to obtain a second measurement, the second drive signal having a second frequency and a second amplitude. At least the first frequency is different from the second frequency, or the first amplitude is different from the second amplitude. The system further includes a processor coupled to receive the first and second measurements, to derive, based at least in part on the first and second measurements, a resistivity distribution around a borehole.

B. A method that includes disposing, within a borehole that penetrates a subterranean formation, a cable having an array of transmitters along a shared conductive loop, each of the transmitters coupled to a corresponding frequency-dependent material or device. The method further includes applying a first drive signal to the cable to excite the transmitters, to obtain a first measurement, the first drive signal having a first frequency and a first amplitude. The method further includes applying a second drive signal to the cable to excite the transmitters, to obtain a second measurement, the second drive signal having a second frequency and a second amplitude. At least the first frequency is different from the second frequency, or the first amplitude is different from the second amplitude. The method further includes deriving, based at least in part on the first and second measurements, a resistivity distribution around the borehole.

Each of the embodiments, A and B, may have one or more of the following additional elements in any combination.

Element 1: wherein the first frequency is different from the second frequency. Element 2: wherein the first and second drive signals are applied concurrently. Element 3: wherein: the transmitters comprise a first transmitter and a second transmitter; the first transmitter is coupled to a first frequency-dependent device comprising a first bandpass filter centered at the first frequency; and the second transmitter is coupled to a second frequency-dependent device comprising a second bandpass filter centered at the second frequency. Element 4: the first and second drive signals are applied in turn. Element 5: wherein the first and second measurements are obtained from a same electromagnetic sensor. Element 6: wherein: the first measurement is obtained from a first electromagnetic sensor; and the second measurement is obtained from a second electromagnetic sensor different from the first electromagnetic sensor. Element 7: wherein the first amplitude is different from the second amplitude. Element 8: wherein the frequency-dependent material or device coupled to each of the transmitters produces spectrally-distinctive, linearly-independent spectra with respect to others of the transmitters. Element 9: wherein each of the transmitters is coupled to the corresponding frequency-dependent material comprising a ferromagnetic core, the ferromagnetic cores saturating at different magnetic field levels to provide said spectrally-distinctive spectra. Element 10: wherein each of the transmitters is coupled to the corresponding frequency-dependent material comprising a nonlinear component that provides a waveform spectrally distinguishable from waveforms of others of said transmitters. Element 11: further comprising combining the first and second measurements with particular weights to obtain an individual contribution of a first transmitter of the transmitters. Element 12: wherein the weights are obtained by solving a matrix equation. Element 13: wherein the transmitters are coupled in parallel along the shared conductive loop. Element 14: wherein the transmitters are coupled in series along the shared conductive loop.

Element 15: wherein the first frequency is different from the second frequency. Element 16: wherein: the transmitters comprise a first transmitter and a second transmitter; the first transmitter is coupled to a first frequency-dependent device comprising a first bandpass filter centered at the first frequency; and the second transmitter is coupled to a second frequency-dependent device comprising a second bandpass filter centered at the second frequency. Element 17: wherein the first amplitude is different from the second amplitude. Element 18: wherein the frequency-dependent material or device coupled to each of the transmitters produces spectrally-distinctive, linearly-independent spectra with respect to others of the transmitters.

Numerous variations and modifications will become apparent to those skilled in the art once the above disclosure is fully appreciated. The methods and systems can be used for monitoring of a permanent reservoir. The ensuing claims are intended to cover such variations where applicable.

What is claimed is:

1. A permanent reservoir monitoring method that comprises:
    applying a first drive signal to a cable to excite a plurality of transmitters of the cable, wherein the first drive signal has a first frequency and a first amplitude and wherein the plurality of transmitters is along a shared conductive loop, each of the plurality of transmitters coupled to a corresponding frequency-dependent material or device;
    applying a second drive signal to the cable to excite the plurality of transmitters, wherein the second drive signal has a second frequency and a second amplitude, wherein at least:
        the first frequency is different from the second frequency; or
        the first amplitude is different from the second amplitude; and
    deriving, based at least in part on first and second measurements obtained respectively from the first and the second drive signals exciting the plurality of transmitters, a resistivity distribution around a borehole.

2. The method of claim 1, wherein the first frequency is different from the second frequency.

3. The method of claim 2, wherein the first and second drive signals are applied concurrently.

4. The method of claim 2, wherein:
    the plurality of transmitters comprises a first transmitter and a second transmitter;
    the first transmitter is coupled to a first frequency-dependent device comprising a first bandpass filter centered at the first frequency; and
    the second transmitter is coupled to a second frequency-dependent device comprising a second bandpass filter centered at the second frequency.

5. The method of claim 1, wherein the first and second drive signals are applied in turn.

6. The method of claim 1, wherein the first and second measurements are obtained from a same electromagnetic sensor.

7. The method of claim 1, wherein:
    the first measurement is obtained from a first electromagnetic sensor; and
    the second measurement is obtained from a second electromagnetic sensor different from the first electromagnetic sensor.

8. The method of claim 1, wherein the first amplitude is different from the second amplitude.

9. The method of claim 1, wherein the frequency-dependent material or device coupled to each of the plurality of transmitters produces spectrally-distinctive, linearly-independent spectra with respect to others of the plurality of transmitters.

10. The method of claim 9, wherein each of the plurality of transmitters is coupled to the corresponding frequency-dependent material comprising a ferromagnetic core, the ferromagnetic cores saturating at different magnetic field levels to provide said spectrally-distinctive spectra.

11. The method of claim 9, wherein each of the plurality of transmitters is coupled to the corresponding frequency-dependent material comprising a nonlinear component that provides a waveform spectrally distinguishable from waveforms of others of said plurality of transmitters.

12. The method of claim 1, further comprising combining the first and second measurements with weights to obtain an individual contribution of a first transmitter of the plurality of transmitters, wherein the weights are obtained by solving a matrix equation.

13. The method of claim 1, wherein the plurality of transmitters is coupled in parallel along the shared conductive loop.

14. The method of claim 1, wherein the plurality of transmitters is coupled in series along the shared conductive loop.

15. A system that comprises:
    a cable disposed within a borehole that penetrates a subterranean formation, the cable having a plurality of transmitters along a shared conductive loop, wherein each of the plurality of transmitters is coupled to a corresponding frequency-dependent material or device;
    a surface interface coupled to the cable, the surface interface having program code stored thereon executable to cause the surface interface to,
        apply a first drive signal to the cable to excite the plurality of transmitters to obtain a first measurement, the first drive signal having a first frequency and a first amplitude; and apply a second drive signal to the cable to excite the plurality of transmitters to obtain a second measurement, the second drive signal having a second frequency and a second amplitude, wherein at least the first frequency is different from the second frequency, or the first amplitude is different from the second amplitude; and a processor coupled to the surface interface, the processor having program code stored thereon executable to cause the processor to, receive the first and second measurements from the first and second drive signals exciting the plurality of transmitters respectively; and to derive, based at least in part on the first and second measurements, a resistivity distribution around the borehole.

16. The system of claim 15, wherein the first frequency is different from the second frequency.

17. The system of claim 16, wherein:

The plurality of transmitters comprises a first transmitter and a second transmitter;

the first transmitter is coupled to a first frequency-dependent device comprising a first bandpass filter centered at the first frequency; and the second transmitter is coupled to a second frequency-dependent device comprising a second bandpass filter centered at the second frequency.

18. The system of claim 15, wherein the first amplitude is different from the second amplitude.

19. The system of claim 18, wherein the frequency-dependent material or device coupled to each of the plurality of transmitters produces spectrally-distinctive, linearly-independent spectra with respect to others of the plurality of transmitters.

20. The system of claim 15, wherein the program code executable to cause the surface interface to apply the first drive signal and apply the second drive signal comprises program code to apply the first drive signal and the second drive signal concurrently.

* * * * *